(12) United States Patent
Wang et al.

(10) Patent No.: US 12,429,626 B2
(45) Date of Patent: Sep. 30, 2025

(54) METHOD AND DEVICE FOR DATA-DRIVEN FRACTURE-CAVITY RESERVOIR DEVELOPMENT AND EVALUATION, AND STORAGE MEDIUM

(71) Applicant: China University of Petroleum-Beijing, Beijing (CN)

(72) Inventors: Daigang Wang, Beijing (CN); Jin Chen, Beijing (CN); Yong Li, Beijing (CN); Kaoping Song, Beijing (CN); Yang Song, Beijing (CN); Xiukun Wang, Beijing (CN); Qi Wang, Beijing (CN); Bin Huang, Beijing (CN); Lifeng Chen, Beijing (CN); Cheng Fu, Beijing (CN); Xinxuan Qi, Beijing (CN)

(73) Assignee: China University of Petroleum—Beijing, Beijing (CN)

( * ) Notice: Subject to any disclaimer, the term of this patent is extended or adjusted under 35 U.S.C. 154(b) by 37 days.

(21) Appl. No.: 18/662,259

(22) Filed: May 13, 2024

(65) Prior Publication Data
US 2025/0251527 A1     Aug. 7, 2025

(30) Foreign Application Priority Data
Feb. 2, 2024    (CN) ............. 202410154701

(51) Int. Cl.
*G01V 20/00*     (2024.01)
*E21B 49/08*     (2006.01)

(52) U.S. Cl.
CPC .......... *G01V 20/00* (2024.01); *E21B 49/0875* (2020.05); *E21B 2200/20* (2020.05); *E21B 2200/22* (2020.05)

(58) Field of Classification Search
CPC . G01V 20/00; E21B 49/0875; E21B 2200/20; E21B 2200/22
(Continued)

(56) References Cited

U.S. PATENT DOCUMENTS

| 7,565,278 B2* | 7/2009 | Li .................. G06F 30/23 |
| | | 703/2 |
| 9,026,416 B2* | 5/2015 | Mallison ......... G06F 30/23 |
| | | 703/10 |

(Continued)

FOREIGN PATENT DOCUMENTS

| CN | 106951641 A | 7/2017 |
| CN | 105041277 B | 1/2018 |

(Continued)

OTHER PUBLICATIONS

Vargas-Murillo et al (Structural Uncertainty and Inverse Characterization of Discrete Fracture Networks with Dynamic Data, International Petroleum Technology Conference, 2015, pp. 1-18) (Year: 2015).*

(Continued)

*Primary Examiner* — Iftekhar A Khan
(74) *Attorney, Agent, or Firm* — Davis Wright Tremaine LLP

(57) ABSTRACT

The present application provides a method and device for data-driven fracture-cavity reservoir development and evaluation and a storage medium. The method includes: obtaining a fracture-cavity spatial topological relationship, a geometric shape and a fracture-cavity physical model of fault-controlled fractures and cavities, and establishing a first fault-controlled fracture-cavity reservoir discrete spatial topological network model corresponding to the fault-controlled fractures and cavities according to the fracture-cavity spatial topological relationship and geometric shape; performing, according to the first fault-controlled fracture-
(Continued)

cavity reservoir discrete spatial topological network model, modeling processing on quantitative representation of production performance of a fault-controlled fracture-cavity reservoir using fluid vertical equilibrium mechanism and non-Darcy flow law, to form a quantitative representation model of production performance of fault-controlled fracture-cavity reservoir; performing analyzing processing on the quantitative representation model to obtain a development performance characteristic of the fault-controlled fracture-cavity reservoir, and developing the fault-controlled fracture-cavity reservoir according to the development performance characteristic.

6 Claims, 7 Drawing Sheets

(58) Field of Classification Search
USPC .................................................. 703/6
See application file for complete search history.

(56) References Cited

U.S. PATENT DOCUMENTS

| | | | |
|---|---|---|---|
| 9,068,448 B2* | 6/2015 | Hui | G06F 30/23 |
| 10,267,123 B2* | 4/2019 | Hoeink | G06F 30/28 |
| 10,267,132 B2* | 4/2019 | Hoeink | E21B 43/27 |
| 10,309,216 B2* | 6/2019 | Tueckmantel | E21B 43/26 |
| 10,572,611 B2* | 2/2020 | Huang | G01V 20/00 |
| 10,641,923 B2* | 5/2020 | Jerbi | E21B 43/00 |
| 10,914,140 B2* | 2/2021 | Sepehrnoori | G06F 30/20 |
| 11,073,006 B2* | 7/2021 | Hoeink | G01V 1/46 |
| 11,294,095 B2* | 4/2022 | Mustapha | E21B 43/16 |
| 11,320,555 B2* | 5/2022 | Mlao | G01V 1/301 |
| 11,371,333 B2* | 6/2022 | Mustapha | G06F 17/16 |
| 11,506,805 B2* | 11/2022 | Sepehrnoori | G01V 1/46 |
| 11,530,600 B2* | 12/2022 | Mustapha | G06F 30/28 |
| 12,228,026 B2* | 2/2025 | Bouaouaja | E21B 43/26 |
| 12,298,458 B2* | 5/2025 | Geiser | G01V 1/50 |
| 2010/0138196 A1* | 6/2010 | Hui | E21B 49/00 703/1 |
| 2010/0138202 A1* | 6/2010 | Mallison | G01V 1/18 703/10 |
| 2011/0029293 A1* | 2/2011 | Petty | G06F 30/20 703/2 |
| 2012/0158380 A1* | 6/2012 | Hajibeygi | G06F 17/11 703/2 |
| 2012/0318500 A1* | 12/2012 | Urbancic | E21B 43/26 166/250.1 |
| 2013/0199789 A1* | 8/2013 | Liang | E21B 43/263 166/305.1 |
| 2014/0046636 A1* | 2/2014 | Mustapha | E21B 43/26 703/2 |
| 2014/0083687 A1* | 3/2014 | Poe | E21B 49/00 166/250.1 |
| 2014/0136158 A1* | 5/2014 | Hegazy | G06T 17/20 703/2 |
| 2014/0372094 A1* | 12/2014 | Holland | E21B 47/0224 703/10 |
| 2016/0124116 A1* | 5/2016 | Souche | G01V 20/00 703/2 |
| 2016/0131800 A1* | 5/2016 | Pecher | G06F 30/23 703/10 |
| 2016/0356125 A1* | 12/2016 | Bello | G06Q 10/04 |
| 2017/0045636 A1* | 2/2017 | Ma | E21B 43/26 |
| 2018/0003841 A1* | 1/2018 | Souche | G01V 1/345 |
| 2018/0258763 A1* | 9/2018 | King, Jr. | G01R 33/305 |
| 2019/0025460 A1* | 1/2019 | Mustapha | E21B 43/16 |
| 2019/0186255 A1* | 6/2019 | Mustapha | E21B 44/00 |
| 2020/0184130 A1* | 6/2020 | Sepehrnoori | E21B 49/00 |
| 2021/0063590 A1* | 3/2021 | Cooper | G01V 1/34 |
| 2021/0350208 A1* | 11/2021 | Wang | G06N 3/08 |
| 2022/0107433 A1* | 4/2022 | Maucec | G01V 1/308 |
| 2022/0136382 A1* | 5/2022 | Geiser | E21B 47/12 702/6 |
| 2023/0229830 A1* | 7/2023 | Zhao | E21B 43/26 703/2 |

FOREIGN PATENT DOCUMENTS

| | | |
|---|---|---|
| CN | 112329232 A | 2/2021 |
| CN | 114429085 A | 5/2022 |
| CN | 115146888 A | 10/2022 |
| CN | 116579173 A | 8/2023 |
| CN | 116663370 A | 8/2023 |

OTHER PUBLICATIONS

Zongjie et al. (Fault recognition in a fractured-vuggy reservoir, 2021, Society of Exploration Geophysicists, pp. 1101-1105) (Year: 2021).*

The State Intellectual Property Office of People's Republic of China, "First Office Action" in Application No. 202410154701.4, Jul. 17, 2024, 12 pages.

* cited by examiner

METHOD AND DEVICE FOR DATA-DRIVEN FRACTURE-CAVITY RESERVOIR DEVELOPMENT AND EVALUATION, AND STORAGE MEDIUM

CROSS-REFERENCE TO RELATED APPLICATIONS

This present application claims the priority of Chinese Patent Application No. 202410154701.4 filed on Feb. 2, 2024, which is hereby incorporated by reference in its entirety.

TECHNICAL FIELD

The present application relates to the field of oil-gas development and, in particular, to a method and device for data-driven fracture-cavity reservoir development and evaluation, and a storage medium.

BACKGROUND

With the development of carbonate oil-gas resources all over the world, it has become a direction having application prospects to study production performance representation methods suitable for fracture-cavity carbonate reservoirs, which is of great significance to support the scale benefit development as well as exploitation-production and stable production of crude oil in Tarim Basin.

In the prior art, three main kinds of grid representation methods, namely equivalent medium models, dual-medium or multi-medium models and discrete fracture-cavity network models, are established to describe the complex flow law of karst fracture-cavity reservoirs accurately. However, it is difficult for the equivalent medium models and multi-medium models to describe the fluid exchange law in multi-scale discrete fracture-cavity mediums accurately, which leads to poor adaptability of development performance representation of an actual fracture-cavity reservoir; while the discrete fracture-cavity network models are prone to encounter problems of the grid angle effect and poor convergence, which is not suitable for large-scale reservoir simulation calculation.

SUMMARY

The present application provides a method and device for data-driven fracture-cavity reservoir development and evaluation, and a storage medium, which are used to solve the technical problems of low calculation efficiency, poor result reliability and difficulty in accurately describing a complex fluid exchange law of a multi-scale fracture-cavity medium in the prior art.

In a first aspect, the present application provides a method for data-driven fracture-cavity reservoir development and evaluation, including:

obtaining a fracture-cavity spatial topological relationship, a geometric shape and a fracture-cavity physical model of fault-controlled fractures and cavities, and establishing a first fault-controlled fracture-cavity reservoir discrete spatial topological network model corresponding to the fault-controlled fractures and cavities according to the fracture-cavity spatial topological relationship and the geometric shape;

performing, according to the first fault-controlled fracture-cavity reservoir discrete spatial topological network model, modeling processing on quantitative representation of production performance of a fault-controlled fracture-cavity reservoir by using a fluid vertical equilibrium mechanism and a non-Darcy flow law, to form a quantitative representation model of the production performance of the fault-controlled fracture-cavity reservoir;

performing analyzing processing on the quantitative representation model of the production performance of the fault-controlled fracture-cavity reservoir to obtain a development performance characteristic of the fault-controlled fracture-cavity reservoir, and developing the fault-controlled fracture-cavity reservoir according to the development performance characteristic.

In an implementation, the performing the analyzing processing on the quantitative representation model of the production performance of the fault-controlled fracture-cavity reservoir to obtain the development performance characteristic of the fault-controlled fracture-cavity reservoir includes:

performing the analyzing processing on the quantitative representation model of the production performance of the fault-controlled fracture-cavity reservoir to obtain sensitive parameters corresponding to the fault-controlled fractures and cavities;

performing inversion processing on the sensitive parameters to obtain an inversion result;

analyzing the sensitive parameters according to the inversion result to obtain the development performance characteristic of the fault-controlled fracture-cavity reservoir.

In an implementation, the performing the inversion processing on the sensitive parameters to obtain the inversion result includes:

obtaining a cumulative oil production corresponding to the fault-controlled fractures and cavities, establishing a correspondence between the cumulative oil production and the sensitive parameters according to the sensitive parameters, and analyzing a sensitivity of the cumulative oil production according to the correspondence to obtain sensitive parameter values corresponding to the fault-controlled fractures and cavities;

performing the inversion processing on the sensitive parameters corresponding to the fault-controlled fractures and cavities according to the sensitive parameter values to obtain the inversion result.

In an implementation, the performing the inversion processing on the sensitive parameters corresponding to the fault-controlled fractures and cavities according to the sensitive parameter values to obtain the inversion result includes:

processing the sensitive parameters by using a least square objective function to obtain performance representation parameters;

performing, according to the sensitive parameter values, inversion processing on the performance representation parameters by using a particle swarm algorithm to obtain the inversion result.

In an implementation, before performing the analyzing processing on the quantitative representation model of the production performance of the fault-controlled fracture-cavity reservoir to obtain the development performance characteristic of the fault-controlled fracture-cavity reservoir, the method includes:

performing fluid vertical equilibrium testing processing on the fracture-cavity physical model to obtain a first dynamic evolution law of oil-water distribution;

establishing a second fault-controlled fracture-cavity reservoir discrete spatial topological network model according to the fracture-cavity physical model, and performing fluid vertical equilibrium testing processing on the second fault-controlled fracture-cavity reservoir discrete spatial topological network model according to the quantitative representation model of the production performance of the fault-controlled fracture-cavity reservoir to obtain a second dynamic evolution law of oil-water distribution;

determining an accuracy parameter of the quantitative representation model of the production performance of the fault-controlled fracture-cavity reservoir according to the first dynamic evolution law and the second dynamic evolution law;

when the accuracy parameter indicates that the quantitative representation model of the production performance of the fault-controlled fracture-cavity reservoir is accurate, performing the analyzing processing on the quantitative representation model of the production performance of the fault-controlled fracture-cavity reservoir to obtain the development performance characteristic of the fault-controlled fracture-cavity reservoir.

In an implementation, the establishing the first fault-controlled fracture-cavity reservoir discrete spatial topological network model corresponding to the fault-controlled fractures and cavities according to the fracture-cavity spatial topological relationship and the geometric shape includes:

performing segmentation processing on the fault-controlled fractures and cavities according to the fracture-cavity spatial topological relationship and the geometric shape to obtain a plurality of segmented bodies; where the segmented bodies include fracture-segmented bodies and cavity-segmented bodies;

performing analyzing processing on the plurality of segmented bodies to obtain geometric parameters of respective segmented bodies and a distance threshold value between the segmented bodies;

establishing the first fault-controlled fracture-cavity reservoir discrete spatial topological network model corresponding to the fault-controlled fractures and cavities according to the geometric parameters and the distance threshold value.

In an implementation, the performing, according to the first fault-controlled fracture-cavity reservoir discrete spatial topological network model, the modeling processing on the quantitative representation of the production performance of the fault-controlled fracture-cavity reservoir by using the fluid vertical equilibrium mechanism and the non-Darcy flow law includes:

establishing, according to the first fault-controlled fracture-cavity reservoir discrete spatial topological network model, a continuity equation and a motion equation of fluid in the fault-controlled fractures and cavities by using the fluid vertical equilibrium mechanism and the non-Darcy flow law;

performing coupling processing on the continuity equation and the motion equation to obtain a coupling result, and performing the modeling processing on the quantitative representation of the production performance of the fault-controlled fracture-cavity reservoir according to the coupling result.

In a second aspect, the present application provides a device for data-driven fracture-cavity reservoir development and evaluation, including:

an obtaining module, configured to obtain a fracture-cavity spatial topological relationship, a geometric shape and a fracture-cavity physical model of fault-controlled fractures and cavities, and establish a first fault-controlled fracture-cavity reservoir discrete spatial topological network model corresponding to the fault-controlled fractures and cavities according to the fracture-cavity spatial topological relationship and the geometric shape;

a processing module, configured to perform, according to the first fault-controlled fracture-cavity reservoir discrete spatial topological network model, modeling processing on quantitative representation of production performance of a fault-controlled fracture-cavity reservoir by using a fluid vertical equilibrium mechanism and a non-Darcy flow law, to form a quantitative representation model of the production performance of the fault-controlled fracture-cavity reservoir;

an analyzing module, configured to perform analyzing processing on the quantitative representation model of the production performance of the fault-controlled fracture-cavity reservoir to obtain a development performance characteristic of the fault-controlled fracture-cavity reservoir, and develop the fault-controlled fracture-cavity reservoir according to the development performance characteristic.

In an implementation, the obtaining module is further configured to: perform segmentation processing on the fault-controlled fractures and cavities according to the fracture-cavity spatial topological relationship and the geometric shape to obtain a plurality of segmented bodies; where the segmented bodies include fracture-segmented bodies and cavity-segmented bodies;

perform analyzing processing on the plurality of segmented bodies to obtain geometric parameters of respective segmented bodies and a distance threshold value between the segmented bodies;

establish the first fault-controlled fracture-cavity reservoir discrete spatial topological network model corresponding to the fault-controlled fractures and cavities according to the geometric parameters and the distance threshold value.

In an implementation, the processing module is further configured to:

establish, according to the first fault-controlled fracture-cavity reservoir discrete spatial topological network model, a continuity equation and a motion equation of fluid in the fault-controlled fractures and cavities by using the fluid vertical equilibrium mechanism and the non-Darcy flow law;

perform coupling processing on the continuity equation and the motion equation to obtain a coupling result, and perform the modeling processing on the quantitative representation of the production performance of the fault-controlled fracture-cavity reservoir according to the coupling result.

In an implementation, the analyzing module is further configured to:

perform fluid vertical equilibrium testing processing on the fracture-cavity physical model to obtain a first dynamic evolution law of oil-water distribution;

establish a second fault-controlled fracture-cavity reservoir discrete spatial topological network model according to the fracture-cavity physical model, and perform fluid vertical equilibrium testing processing on the second fault-controlled fracture-cavity reservoir discrete spatial topological network model according to the quantitative representation model of the production performance of the fault-controlled fracture-cavity reservoir to obtain a second dynamic evolution law of oil-water distribution;

determine an accuracy parameter of the quantitative representation model of the production performance of the fault-controlled fracture-cavity reservoir according to the first dynamic evolution law and the second dynamic evolution law;

when the accuracy parameter indicates that the quantitative representation model of the production performance of the fault-controlled fracture-cavity reservoir is accurate, perform the analyzing processing on the quantitative representation model of the production performance of the fault-controlled fracture-cavity reservoir to obtain the development performance characteristic of the fault-controlled fracture-cavity reservoir.

In an implementation, the analyzing module is further configured to:

perform the analyzing processing on the quantitative representation model of the production performance of the fault-controlled fracture-cavity reservoir to obtain sensitive parameters corresponding to the fault-controlled fractures and cavities;

perform inversion processing on the sensitive parameters to obtain an inversion result;

analyze the sensitive parameters according to the inversion result to obtain the development performance characteristic of the fault-controlled fracture-cavity reservoir.

In an implementation, the analyzing module is further configured to:

obtain a cumulative oil production corresponding to the fault-controlled fractures and cavities, establish a correspondence between the cumulative oil production and the sensitive parameters according to the sensitive parameters, and analyze a sensitivity of the cumulative oil production according to the correspondence to obtain sensitive parameter values corresponding to the fault-controlled fractures and cavities;

perform the inversion processing on the sensitive parameters corresponding to the fault-controlled fractures and cavities according to the sensitive parameter values to obtain the inversion result.

In an implementation, the analyzing module is further configured to:

process the sensitive parameters by using a least square objective function to obtain performance representation parameters;

perform, according to the sensitive parameter values, inversion processing on the performance representation parameters by using a particle swarm algorithm to obtain the inversion result.

In a third aspect, the present application provides a device for data-driven fracture-cavity reservoir development and evaluation, including:

a processor and a memory;

the memory stores computer execution instructions;

the processor executes the computer execution instructions stored in the memory to cause the device for data-driven fracture-cavity reservoir development and evaluation to execute the method for data-driven fracture-cavity reservoir development and evaluation according to any of the first aspect.

In a fourth aspect, the present application provides a computer-readable storage medium, having computer execution instructions stored thereon, and when the computer execution instructions are executed by a processor, the method for data-driven fracture-cavity reservoir development and evaluation according to any of the first aspect is implemented.

The present application provides the method and device for data-driven fracture-cavity reservoir development and evaluation and the storage medium. The fractures and cavities are segmented according to the fracture-cavity spatial topological relationship and the geometric shape to obtain the segmented bodies, and the segmented bodies are analyzed, so as to establish the first fault-controlled fracture-cavity reservoir discrete spatial topological network model which can accurately describe the complex fracture-cavity structure in the reservoir. The model which can quantitatively represent the production performance of the reservoir is established according to the fault-controlled fracture-cavity reservoir discrete spatial topological network model, and the reliability of the quantitative representation model of the production performance of the fault-controlled fracture-cavity reservoir is verified by the fluid vertical equilibrium testing processing, which further improves the accuracy of the quantitative representation model of the production performance of the fault-controlled fracture-cavity reservoir. The development performance characteristic can be obtained by performing analyzing processing on the quantitative representation model of the production performance of the fault-controlled fracture-cavity reservoir, which provides guidance and decision-making basis for development of the fault-controlled fracture-cavity reservoir.

BRIEF DESCRIPTION OF DRAWINGS

The following drawings, which are incorporated in and constitute a part of this specification, illustrate embodiments consistent with the present application, and together with the description, serve to explain the principles of the present application.

Figure 1:
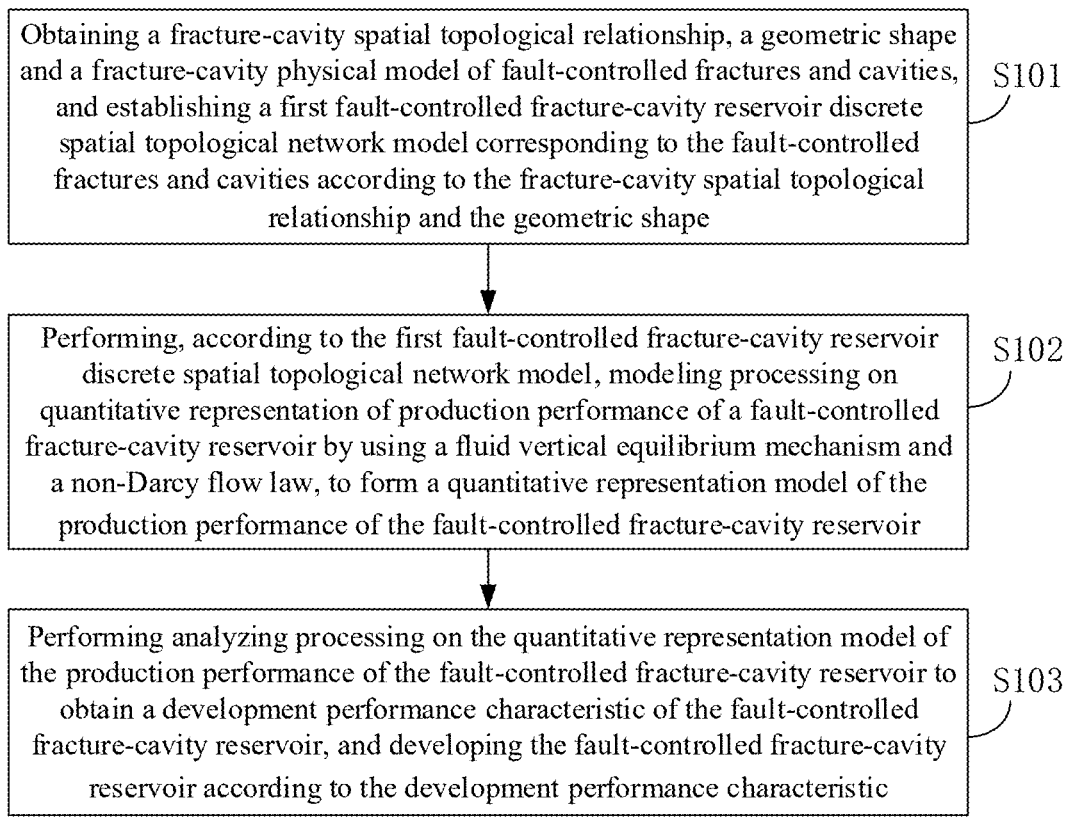
FIG. 1 is schematic flow chart I of a method for data-driven fracture-cavity reservoir development and evaluation provided by an embodiment of the present application.

Through the above drawings, explicit embodiments of the present application have been shown, and will be described in more detail later. These drawings and descriptions are not intended to limit the scope of the concept of the present application in any way, but to explain the concept of the present application to those skilled in the art by referring to specific embodiments.

DESCRIPTION OF EMBODIMENTS

Here, exemplary embodiments, whose examples are shown in the drawings, will be illustrated in detail. When the following description refers to the drawings, unless otherwise indicated, the same numbers in different drawings indicate the same or similar elements. The embodiments described in the following exemplary embodiments do not represent all embodiments consistent with the present application. Rather, they are merely examples of devices and methods consistent with some aspects of the present application as detailed in the appended claims.

Carbonate reservoirs play an important role in ensuring strategic energy security. Due to the transformation of multi-stage geological structure and karstification, a fracture-cavity reservoir body has complex structure and high heterogeneity. The permeable-storage space includes large karst caves, dissolution pores, faults, fractures and so on, and has obvious multi-scale characteristics. The large karst caves and faults are important reservoirs. The fractures of different scales have strong flow conductivity and are main flow channels, and there are many flow forms such as seepage, pipe flow and cave flow at the same time, resulting in complex law of development performance of different types of fracture-cavity units.

In order to accurately describe the complex flow law of karst fracture-cavity reservoirs, researchers have established three main kinds of grid representation methods: equivalent medium models, dual-medium or multi-medium models and discrete fracture-cavity network models. An equivalent medium model is a representation method that simplifies a complex porous medium into an equivalent single-pore medium, which provides convenience for flow simulation and prediction. A dual-medium or multi-medium model divides a complex karst fracture-cavity reservoir into different medium types. By introducing grids of different medium types into the model to describe fluid flow behaviors of different medium types in the karst fracture-cavity reservoir, the accuracy of simulation is improved. However, due to the large difference of scales of the permeable-storage space in the fracture-cavity reservoir, it is difficult for the equivalent medium model and the multi-medium model to accurately describe the fluid exchange law in the multi-scale discrete fracture-cavity medium, which leads to poor adaptability of development performance representation of an actual fracture-cavity reservoir.

A discrete fracture-cavity network (DFVN) model is a discreteness-based description method of a fracture-cavity network structure. The discrete fracture-cavity network model may divide a fracture-cavity type medium into a rock system (including a bedrock, micro-fractures and micro-dissolved pores), a fracture system and a cavity system. Fractures and cavities are nested in the rock and interconnected into a network. The cavity system acts as a free-flowing region, and the rock system and the fracture system act as a seepage region. The seepage region may be regarded as a classical discrete fracture model, so the DFVN model can be an effective extension and expansion of the discrete fracture model. In the discrete fracture-cavity network model, each of the nodes and the edges has a specific property. By establishing the fracture-cavity network model, the complex flow law in the karst fracture-cavity reservoir can be simulated and predicted, but it is prone to encounter problems of the grid angle effect and poor convergence, so it is difficult to be used in large-scale reservoir simulation calculation.

In view of the problems in the prior art, the present application provides a method and device for data-driven fracture-cavity reservoir development and evaluation and a storage medium. Accurate description of fault-controlled fractures and cavities is achieved by establishing a first fault-controlled fracture-cavity reservoir discrete spatial topological network model corresponding to a fault-controlled fracture-cavity spatial topological relationship and a geometric shape. Then a quantitative representation model of production performance of a fault-controlled fracture-cavity reservoir which can quantitatively represent the reservoir is established according to the fault-controlled fracture-cavity reservoir discrete spatial topological network model, so as to achieve fast and accurate description of the fluid exchange law in a multi-scale discrete fracture-cavity medium. After that, the quantitative representation model of the production performance of the fault-controlled fracture-cavity reservoir is used to perform fast simulation on a specific fault-controlled fracture-cavity reservoir unit, thereby achieving fast and accurate representation of the evolution law of production performance indicators.

The technical solutions of the present application and how the technical solutions of the present application solve the above technical problems will be described in detail with following specific embodiments. The following specific embodiments can be combined with each other, and the same or similar concepts or processes may not be repeated in some embodiments. Embodiments of the present application will be described below with reference to the drawings.

FIG. 1 is flow chart I of a method for data-driven fracture-cavity reservoir development and evaluation provided by an embodiment of the present application. As shown in FIG. 1, a method for data-driven fracture-cavity reservoir development and evaluation provided by this embodiment includes the following steps.

S101, obtaining a fracture-cavity spatial topological relationship, a geometric shape and a fracture-cavity physical model of fault-controlled fractures and cavities, and establishing a first fault-controlled fracture-cavity reservoir discrete spatial topological network model corresponding to the fault-controlled fractures and cavities according to the fracture-cavity spatial topological relationship and the geometric shape.

In this embodiment, segmentation processing is performed on the fault-controlled fractures and cavities according to the fracture-cavity spatial topological relationship and the geometric shape to obtain segmented bodies of the fault-controlled fractures and cavities, and the first fault-controlled fracture-cavity reservoir discrete spatial topological network model corresponding to the fault-controlled fractures and cavities is established according to physical properties and geometric parameters between the segmented bodies of the fault-controlled fractures and cavities.

The fracture-cavity spatial topological relationship of the fault-controlled fractures and cavities refers to interconnecting and interacting relationships between the fractures and/or cavities in a faulted-fractured system. The main types of the fracture-cavity spatial topological relationship are as follows: direct connections due to fracture surfaces in the formation process of the fault structure or fractures; indirect connected relationships through other intermediate fracture-cavity or pored mediums; interweaving, cutting or other relationships between intersecting fractures and/or cavities, forming a complex spatial structure; intertwining and intersection of a plurality of fractures and cavities with each other, forming a network topological structure. By understanding the spatial topological relationship of the fault-controlled fractures and cavities, the geometric shape of the fractures and cavities can be better described.

S102, performing, according to the first fault-controlled fracture-cavity reservoir discrete spatial topological network model, modeling processing on quantitative representation of production performance of a fault-controlled fracture-cavity reservoir by using a fluid vertical equilibrium mechanism and a non-Darcy flow law, to form a quantitative representation model of the production performance of the fault-controlled fracture-cavity reservoir.

In this embodiment, according to the first fault-controlled fracture-cavity reservoir discrete spatial topological network model, a vertical equilibrium model of fluid in the fracture-cavity network is established by using the fluid mechanics principle, and non-Darcy flow characteristics of the fault-controlled fracture-cavity reservoir need to be considered, so as to establish the quantitative representation model of the production performance of the fault-controlled fracture-cavity reservoir.

The fluid vertical equilibrium mechanism refers to a mechanism and principle that the fluid in the reservoir, which include oil and water, reach an equilibrium state in the vertical direction under the effect of gravity. At the same time, due to the existence of gravity, there is a pressure gradient from top to bottom for the fluid in the reservoir. The non-Darcy flow law refers to a phenomenon and law that while the fluid pass through pores in a porous medium, the fluid flow shows a non-Darcy behavior when the flow velocity is high or the pore diameter is small. Characteristics and mechanism of the non-Darcy flow law include: under a condition of non-Darcy flow, the flow of the fluid in the porous medium will produce additional seepage resistance, which is related to the pore size, surface roughness and fluid flow velocity. One of the characteristics of the non-Darcy flow is that seepage no longer follows a linear relationship, that is, the fluid velocity is no longer in direct proportion to the pressure gradient, but in a nonlinear relationship.

S103, performing analyzing processing on the quantitative representation model of the production performance of the fault-controlled fracture-cavity reservoir to obtain a development performance characteristic of the fault-controlled fracture-cavity reservoir, and developing the fault-controlled fracture-cavity reservoir according to the development performance characteristic.

In this embodiment, for an actual fault-controlled fracture-cavity reservoir development unit, the development performance characteristic of the fault-controlled fracture-cavity reservoir is obtained by performing fast simulation using the quantitative representation model of the production performance of the fault-controlled fracture-cavity reservoir and by performing the analyzing processing on the quantitative representation model of the production performance of the fault-controlled fracture-cavity reservoir. Then the production performance law and vertical remaining oil developing situation under the current development condition are known from the development performance characteristic, for guiding the spatial volume development of the fault-controlled fracture-cavity reservoir.

The present application provides the method for data-driven fracture-cavity reservoir development and evaluation. In the method, the fracture-cavity spatial topological relationship, the geometric shape and the fracture-cavity physical model of the fault-controlled fractures and cavities are obtained, and the first fault-controlled fracture-cavity reservoir discrete spatial topological network model corresponding to the fault-controlled fractures and cavities is established according to the fracture-cavity spatial topological relationship and the geometric shape. According to the first fault-controlled fracture-cavity reservoir discrete spatial topological network model, the modeling processing is performed on the quantitative representation of the production performance of the fault-controlled fracture-cavity reservoir by using the fluid vertical equilibrium mechanism and the non-Darcy flow law, to form the quantitative representation model of the production performance of the fault-controlled fracture-cavity reservoir. The analyzing processing is performed on the quantitative representation model of the production performance of the fault-controlled fracture-cavity reservoir to obtain the development performance characteristic of the fault-controlled fracture-cavity reservoir, and the fault-controlled fracture-cavity reservoir is developed according to the development performance characteristic. Therefore, the fault-controlled fracture-cavity reservoir discrete spatial topological network model corresponding to the fault-controlled fractures and cavities is established according to the fracture-cavity spatial topological relationship and the geometric shape, which can accurately describe the complex fracture-cavity structure in the reservoir and provide accurate data basis for subsequent performance evaluation. According to the fault-controlled fracture-cavity reservoir discrete spatial topological network model, the model that can quantitatively represent the production performance of the reservoir is established by coupling the fluid vertical equilibrium mechanism and the effect of the non-Darcy flow law, which can quickly and comprehensively analyze changes in sensitive parameters in the fault-controlled fracture-cavity reservoir and improve the accuracy of evaluation. For the specific fault-controlled fracture-cavity reservoir development unit, fast simulation is performed by using the quantitative representation model of the production performance of the fault-controlled fracture-cavity reservoir, and the development performance characteristic of the fault-controlled fracture-cavity reservoir is further obtained, which provides a basis for quantitative evaluation of the development characteristic of the fracture-cavity reservoir.

Figure 2:
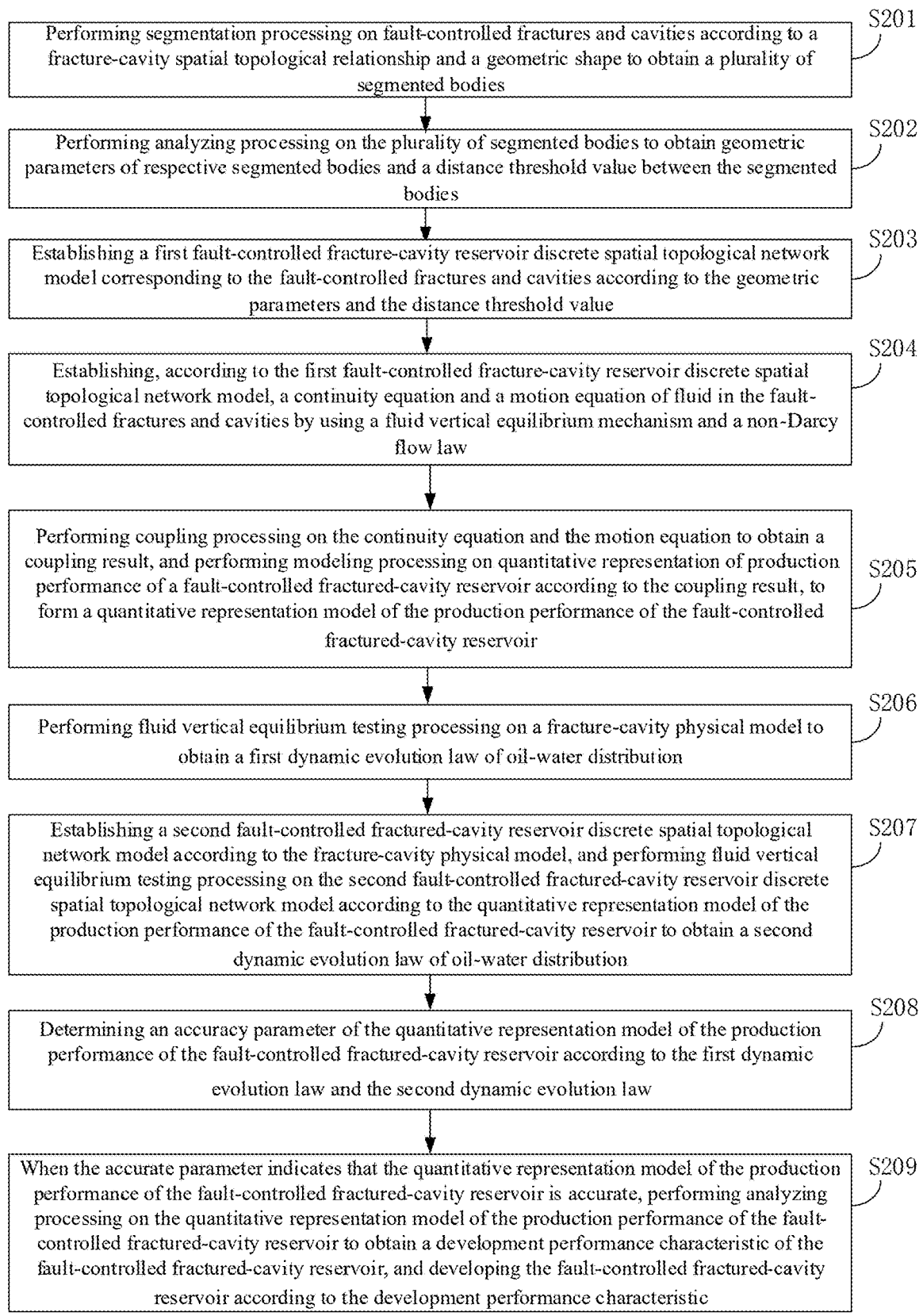
FIG. 2 is schematic flow chart II of a method for data-driven fracture-cavity reservoir development and evaluation provided by an embodiment of the present application.

FIG. 2 is flow chart II of a method for data-driven fracture-cavity reservoir development and evaluation provided by an embodiment of the present application. This embodiment is based on the embodiment of FIG. 1, and describes the method for data-driven fracture-cavity reservoir development and evaluation in detail. As shown in FIG. 2, a method for data-driven fracture-cavity reservoir development and evaluation provided by this embodiment includes the following steps.

S201, performing segmentation processing on fault-controlled fractures and cavities according to a fracture-cavity spatial topological relationship and a geometric shape to obtain a plurality of segmented bodies.

In this embodiment, according to the fracture-cavity spatial topological relationship and the geometric shape, a three-dimensional (3D) marker watershed algorithm is introduced to automatically segment the fault-controlled fractures and cavities for a 3D seismic sculpture model of the actual fracture-cavity development unit, and then a plurality of segmented bodies are obtained, where the segmented bodies include fracture-segmented bodies and cavity-segmented bodies.

The segmentation of the fault-controlled fractures and cavities can use, for example, the 3D marker watershed algorithm introduced above, and a closed curve connecting fracture or cavity boundaries in a fault-controlled fracture-cavity image can also be obtained through edge detection, so as to realize segmentation; or the similarity between adjacent pixels in the fault-controlled fracture-cavity image can be used for segmentation; or a machine learning algorithm is used to train a classifier to segment the fractures and cavities in the fault-controlled fracture-cavity image. This embodiment does not limit this.

S202, performing analyzing processing on the plurality of segmented bodies to obtain geometric parameters of respective segmented bodies and a distance threshold value between the segmented bodies.

In this embodiment, analyzing processing is performed on the plurality of segmented bodies, to determine a central node position of each single fracture-segmented body and a central node position of each single cavities-segmented body as well as the distance threshold value between the segmented bodies, and to obtain the geometric parameters by calculation, such as a fracture volume, a fracture length, a fracture width, a cavity volume, a cavity radius, etc.

S203, establishing a first fault-controlled fracture-cavity reservoir discrete spatial topological network model corresponding to the fault-controlled fractures and cavities according to the geometric parameters and the distance threshold value.

In this embodiment, according to the geometric parameters and the distance threshold value, the cavities-segmented body is further equivalent to a regular sphere, the fracture-segmented body is equivalent to a cylinder, and the fracture surface is simplified to a fracture network. The first fault-controlled fracture-cavity reservoir discrete spatial topological network model is established according to the central node positions of the individual fracture-segmented bodies and individual cavity-segmented bodies, the connection relationship of the fractures and cavities and their geometric parameters.

It should be noted that the execution of the above step S203 needs to meet a condition that the fracture volumes and cavity volumes are completely consistent with geological reserves of the seismic sculpture, where the geological reserves of the seismic sculpture are reserves distribution estimation obtained according to the seismic data interpretation and the geological model.

Figure 3A:
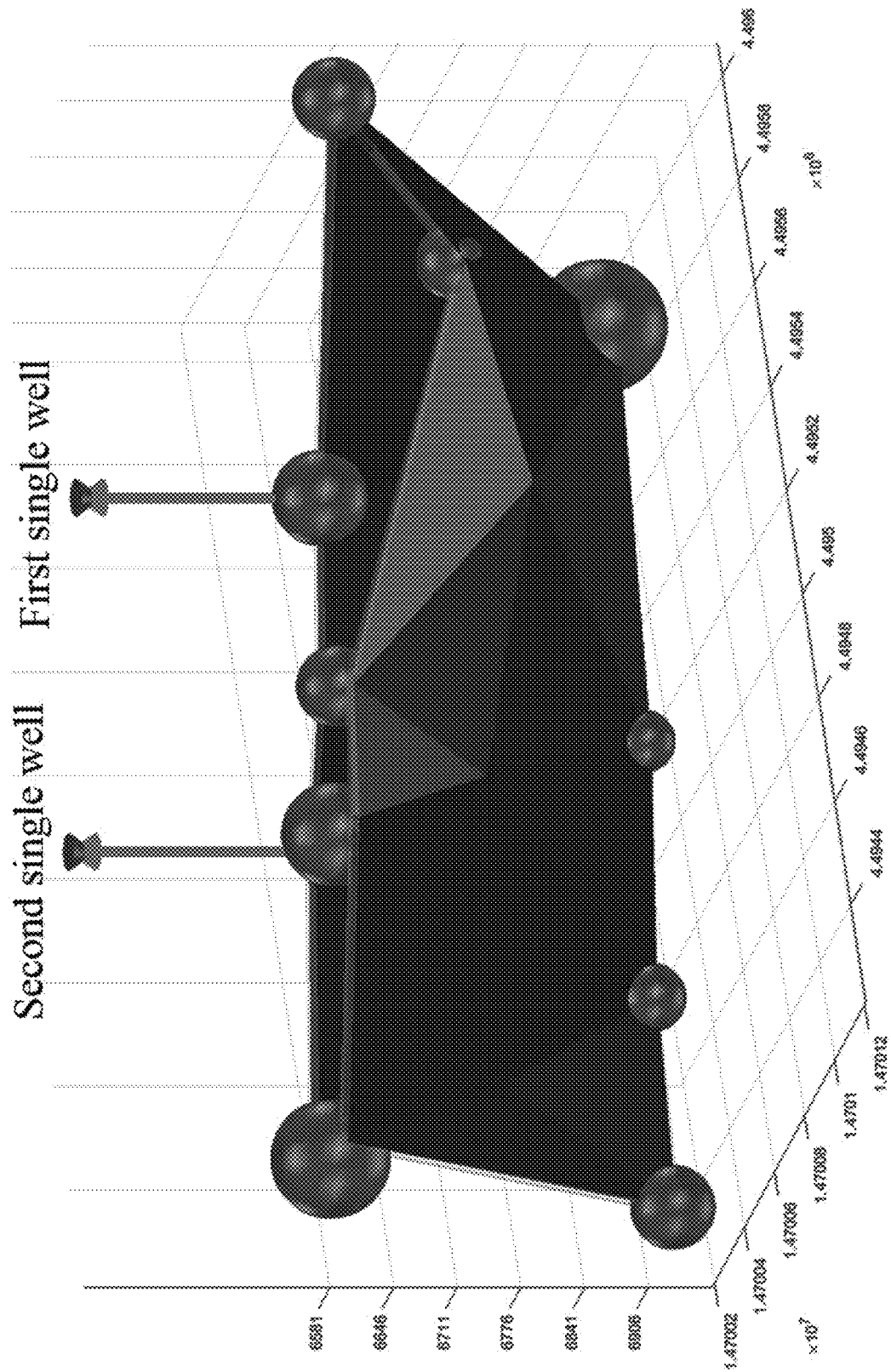
FIG. 3A is a front view of a first fault-controlled fracture-cavity reservoir discrete spatial topological network model provided by an embodiment of the present application.
Figure 3B:
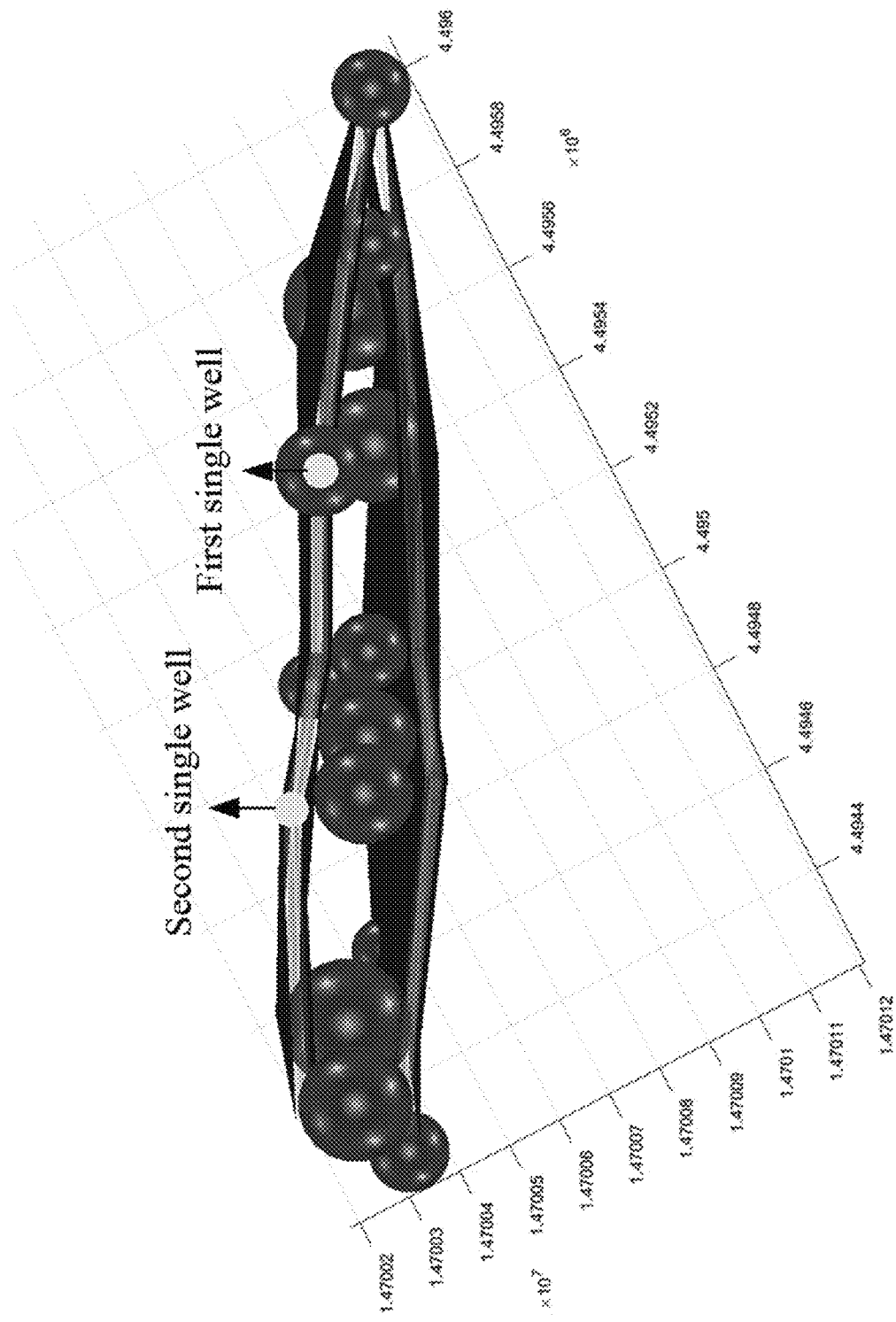
FIG. 3B is a top view of a first fault-controlled fracture-cavity reservoir discrete spatial topological network model provided by an embodiment of the present application.

Specifically, taking an actual fault-controlled fracture-cavity development unit as an example, a first fault-controlled fracture-cavity reservoir discrete spatial topological network model is established. FIG. 3A is a front view of a first fault-controlled fracture-cavity reservoir discrete spatial topological network model provided by an embodiment of the present application. FIG. 3B is a top view of a first fault-controlled fracture-cavity reservoir discrete spatial topological network model provided by an embodiment of the present application. As shown in FIG. 3A and FIG. 3B, the fracture-cavity unit has a total of 22 holes, 50 fractures, and 2 wells. A red ball in the first fault-controlled fracture-cavity reservoir discrete spatial topological network model represents a hole, and a fracture refers to a connection between one of the holes and a hole that is adjacent to this hole. The two wells are a first single well and a second single well, respectively.

S204, establishing, according to the first fault-controlled fracture-cavity reservoir discrete spatial topological network model, a continuity equation and a motion equation of fluid in the fault-controlled fractures and cavities by using a fluid vertical equilibrium mechanism and a non-Darcy flow law.

In this embodiment, when representing a fluid vertical equilibrium phenomenon within a multi-scale discrete fracture-cavity medium, the following processing manner is comprehensively adopted.

(1) The gravity effect is introduced into the motion equation, and the gravitational potential energy is considered in calculation of a flow potential. The expression is as follows:

$$\begin{cases} -(\nabla P_o - \rho_o g \nabla D) = \dfrac{\mu_0}{kk_{ro}\delta_o} v_o \\ -(\nabla P_w - \rho_w g \nabla D) = \dfrac{\mu_w}{kk_{rm}\delta_w} v_w \end{cases} \quad (1)$$

where $p_o$ is pressure of oil phase, $p_w$ is pressure of water phase, $\rho_o$ is density of oil phase, $\rho_w$ is density of water phase, g is gravity acceleration of 9.8 m/s², D is vertical depth with a downward direction as positive, $\mu_o$ is viscosity of oil phase, $\mu_w$ is viscosity of water phase, k is absolute permeability of rock, $k_{ro}$ is relative permeability of oil phase, $k_{rw}$ is relative permeability of water phase, $$\delta_o = \dfrac{1}{1 + \dfrac{kk_{ro}}{\mu_0}\beta\rho_o|V_o|}, \delta_w = \dfrac{1}{1 + \dfrac{kk_{rw}}{\mu_w}\beta\rho_w|V_w|},$$

$|V_o|$ and $|V_w|$ are regarded as oil-water velocity values of the previous time step, $\beta$ is a high-speed non-Darcy flow coefficient, $v_o$ is seepage velocity of oil phase, and $v_w$, is seepage velocity of water phase.

(2) Assuming that oil and water within the cavities are in instantaneous equilibrium, the oil is distributed above and the water is distributed below after vertical equilibrium.

(3) The shape of an oil-water relative permeability curve is changed to represent the mass transfer law of fluid in different flow directions between the fractures and cavities. Because of the multiplicity and strong heterogeneity of the fracture-cavity reservoir, the effect of capillary pressure can be ignored, and a diagonal oil-water relative permeability curve is introduced to represent fluid exchanges from fractures to fractures and from fractures to cavities. For the fluid flow from cavities to fractures, the oil-water two-phase both-permeable area can be changed by adjusting values of irreducible water saturation $S_{w1}$ and water saturation $S_{w2}$ corresponding to residual oil saturation.

S205, performing coupling processing on the continuity equation and the motion equation to obtain a coupling result, and performing modeling processing on quantitative representation of production performance of a fault-controlled fracture-cavity reservoir according to the coupling result, to form a quantitative representation model of the production performance of the fault-controlled fracture-cavity reservoir.

In this embodiment, coupling processing is performed according to the continuity equation and the motion equation, and a coupling equation set can be obtained to describe the production performance of the fault-controlled fracture-cavity reservoir. The coupling equation set can be solved by a numerical simulation method, and then the coupling result can be obtained. According to the coupling result, the quantitative representation model of the production performance of the fault-controlled fracture-cavity reservoir is established, and the expression of the model is:

$$\begin{cases} \frac{\partial}{\partial x}\left[k\lambda_o\delta_o\left(\frac{\partial p_o}{\partial x} - \rho_o g\frac{\partial D}{\partial x}\right)\right] + q_o = \frac{\partial(\varphi\rho_o S_o)}{\partial t} \\ \frac{\partial}{\partial x}\left[\left(\rho_w k\lambda_w\delta_w\left(\frac{\partial p_w}{\partial x} - \rho_w g\frac{\partial D}{\partial x}\right)\right)\right] + q_w = \frac{\partial(\varphi\rho_w S_w)}{\partial t} \end{cases} \quad (2)$$

where $$\lambda_o = \frac{k_{ro}}{\mu_o}$$

is relative fluidity of oil phase, $$\lambda_o = \frac{k_{rw}}{\mu_w}$$

is relative fluidity of water phase, $q_o$ is fluid mass of oil phase injected into unit volume per unit time, $q_w$ is fluid mass of water phase injected into unit volume per unit time, $\varphi$ is porosity of rock, $S_o$ is saturation of oil phase, $S_w$ is saturation of water phase and t is time.

S206, performing fluid vertical equilibrium testing processing on a fracture-cavity physical model to obtain a first dynamic evolution law of oil-water distribution.

In this embodiment, firstly, a visual fracture-cavity physical model is made. According to the visual fracture-cavity physical model and using oil and water to simulate the oil-water layer, the fluid vertical equilibrium testing processing is performed on the fracture-cavity physical model to obtain a first dynamic evolution law of oil-water distribution. In an initial state, there is a layered distribution of oil and water in the fracture-cavity physical model. With the experiment going on, the gravity differentiation effect will redistribute oil and water until they reach a stable state. In the stable state, the distribution of oil and water will be balanced by gravity, and vertical equilibrium will be formed between oil and water. Finally, the first dynamic evolution law of oil-water distribution is obtained.

The visual fracture-cavity physical model may be, for example, a three-fracture three-cavity series-connection visual physical model, or a two-fracture two-cavity series-connection visual physical model, which is not limited in this embodiment.

S207, establishing a second fault-controlled fracture-cavity reservoir discrete spatial topological network model according to the fracture-cavity physical model, and performing fluid vertical equilibrium testing processing on the second fault-controlled fracture-cavity reservoir discrete spatial topological network model according to the quantitative representation model of the production performance of the fault-controlled fracture-cavity reservoir to obtain a second dynamic evolution law of oil-water distribution.

In this embodiment, firstly, according to the visual fracture-cavity physical model, a fracture-cavity reservoir discrete spatial topological network model satisfying geometric consistency is established as the second fault-controlled fracture-cavity reservoir discrete spatial topological network model. In an initial state of this model, saturated oil of cavities, saturated water of fractures, model parameters and conditions are consistent with those in the fluid vertical equilibrium test performed on the visual fracture-cavity physical model, and then the fluid vertical equilibrium testing processing is performed on the second fault-controlled fracture-cavity reservoir discrete spatial topological network model by using the quantitative representation model of the production performance of the fault-controlled fracture-cavity reservoir. For oil and water in the second fault-controlled fracture-cavity reservoir discrete spatial topological network model, as the time passes, the oil gradually moves upward under the buoyancy effect and the water gradually moves downward, resulting in the fluid vertical equilibrium phenomenon. Finally, the second dynamic evolution law of oil-water distribution is obtained.

S208, determining an accuracy parameter of the quantitative representation model of the production performance of the fault-controlled fracture-cavity reservoir according to the first dynamic evolution law and the second dynamic evolution law.

In this embodiment, the first dynamic evolution law and the second dynamic evolution law are compared, and by analyzing the consistency of the first dynamic evolution law and the second dynamic evolution law, the accuracy of the quantitative representation model of the production performance of the fault-controlled fracture-cavity reservoir is verified.

S209, when the accurate parameter indicates that the quantitative representation model of the production performance of the fault-controlled fracture-cavity reservoir is accurate, performing analyzing processing on the quantitative representation model of the production performance of the fault-controlled fracture-cavity reservoir to obtain a development performance characteristic of the fault-controlled fracture-cavity reservoir, and developing the fault-controlled fracture-cavity reservoir according to the development performance characteristic.

Step S209 is similar to the above step S103, and will not be described here again.

The present application provides the method for data-driven fracture-cavity reservoir development and evaluation. In the method, the fractures and cavities are segmented according to the fracture-cavity spatial topological relationship and the geometric shape to obtain the segmented bodies, and the segmented bodies are analyzed, so as to establish the first fault-controlled fracture-cavity reservoir discrete spatial topological network model which can accurately describe the complex fracture-cavity structure in the reservoir. The model which can quantitatively represent the production performance of the reservoir is established according to the fault-controlled fracture-cavity reservoir discrete spatial topological network model, and the reliability of the quantitative representation model of the production performance of the fault-controlled fracture-cavity reservoir is verified by the fluid vertical equilibrium testing processing, which further improves the accuracy of the quantitative representation model of the production performance of the fault-controlled fracture-cavity reservoir. The development performance characteristic can be obtained by performing analyzing processing on the quantitative representation model of the production performance of the fault-controlled fracture-cavity reservoir, which provides guidance and decision-making basis for development of the fault-controlled fracture-cavity reservoir.

Figure 4:
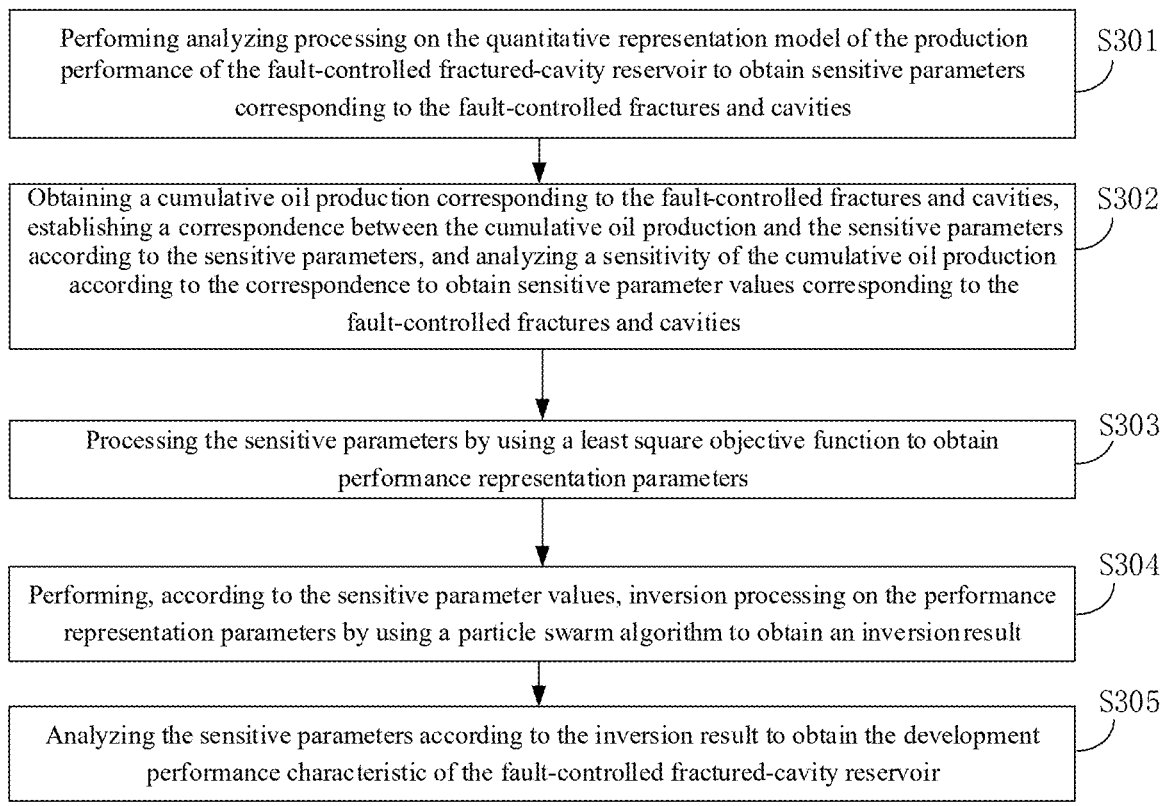
FIG. 4 is schematic flow chart III of a method for data-driven fracture-cavity reservoir development and evaluation provided by an embodiment of the present application.

FIG. 4 is flow chart III of a method for data-driven fracture-cavity reservoir development and evaluation provided by an embodiment of the present application. Based on the embodiment of FIG. 2, this embodiment explains performing the analyzing processing on the quantitative representation model of the production performance of the fault-controlled fracture-cavity reservoir to obtain the development performance characteristic of the fault-controlled fracture-cavity reservoir in detail. As shown in FIG. 4, a method for data-driven fracture-cavity reservoir development and evaluation provided by this embodiment of the present application includes the following steps.

S301, performing analyzing processing on the quantitative representation model of the production performance of the fault-controlled fracture-cavity reservoir to obtain sensitive parameters corresponding to the fault-controlled fractures and cavities.

In this embodiment, numerical difference discretizing is performed on the quantitative representation model of the production performance of the fault-controlled fracture-cavity reservoir, and fluid pressure spatial distributions at n different time steps are obtained by calculation with an implicit solving method. The numerical discrete format of the oil-water two-phase non-Darcy seepage control equation is:

$$\left(T_{oi-\frac{1}{2}}\lambda_{oi-\frac{1}{2}}\delta_o + T_{wi-\frac{1}{2}}\lambda_{wi-\frac{1}{2}}\delta_w\right)p_{i-1}^{n+1} - \\ \begin{pmatrix} T_{oi+\frac{1}{2}}\lambda_{oi+\frac{1}{2}}\delta_o + T_{wi+\frac{1}{2}}\lambda_{wi+\frac{1}{2}}\delta_w T_{oi-\frac{1}{2}}\lambda_{oi-\frac{1}{2}}\delta_o + \\ T_{wi-\frac{1}{2}}\lambda_{wi-\frac{1}{2}}\delta_w + V_i\varphi C_t \end{pmatrix} p_{i-1}^{n+1} + \\ \left(T_{oi+\frac{1}{2}}\lambda_{oi+\frac{1}{2}}\delta_o + T_{wi+\frac{1}{2}}\lambda_{wi+\frac{1}{2}}\delta_w\right)p_{i-1}^{n+1} - \\ \left(T_{oi-\frac{1}{2}}\lambda_{oi-\frac{1}{2}}\delta_o\rho_o + T_{wi-\frac{1}{2}}\lambda_{wi-\frac{1}{2}}\delta_w\rho_w\right)gD_{i-1} + \\ \left(T_{oi+\frac{1}{2}}\lambda_{oi+\frac{1}{2}}\delta_o\rho_o + T_{wi+\frac{1}{2}}\lambda_{wi+\frac{1}{2}}\delta_w\rho_w + T_{oi-\frac{1}{2}}\lambda_{oi-\frac{1}{2}}\delta_o\rho_o + \\ T_{wi-\frac{1}{2}}\lambda_{wi-\frac{1}{2}}\delta_w\rho_w\right)gD_i - \left(T_{oi+\frac{1}{2}}\lambda_{oi+\frac{1}{2}}\delta_o\rho_o + T_{wi+\frac{1}{2}}\lambda_{wi-\frac{1}{2}}\delta_w\rho_w\right)gD_{i+1} = \\ -V_i(q_o/\rho_o + q_w/\rho_w) - \frac{V_i\varphi C_t}{\Delta t}p_i^n$$

(3)

where $C_t$ is a comprehensive compressibility coefficient, $$T_{i\pm 1/2} = \frac{A_i k_{i\pm 1/2}}{\Box x_{i\pm 1/2}},$$

T is oil-water conductivity within fractures, and i is the number of the fracture or cavity.

After obtaining the pressure of any cavity or fracture unit, an upstream upwind difference format is used to update and calculate the oil saturation:

$$S_{oi}^{n+1} = \\ S_{oi}^n + \frac{\Delta t}{V_i \varphi}\bigg(T_{oi+\frac{1}{2}}\lambda_{oi+\frac{1}{2}}\delta_o\left(p_{i+1}^{n+1} - p_i^{n+1}\right) + T_{oi-\frac{1}{2}}\lambda_{oi-\frac{1}{2}}\delta_o\left(p_{i-1}^{n+1} - p_i^{n+1}\right) - \\ T_{oi+\frac{1}{2}}\lambda_{oi+\frac{1}{2}}\delta_o\rho_o g(D_{i+1} - D_i) - T_{oi-\frac{1}{2}}\lambda_{oi-\frac{1}{2}}\delta_o\rho_o g(D_{i-1} - D_i) + \\ V_i q_o/\rho_o - V_i \varphi S_o(C_f + C_o)\frac{p_i^{n+1} - p_i^n}{\Delta t}\bigg)$$

(4)

where $C_o$ is a compressibility coefficient of oil phase, and $$C_f = \frac{1}{\varphi} \cdot \frac{d\varphi}{dp}$$

is a porosity compressibility coefficient of rock.

The magnitude of potentials of oil and water are determined at every time step, and the saturation of a larger potential is taken as the saturation for calculating the conductivity. The change in the saturation is related to fluid exchanges between the fractures and cavities, injection and production, and water intrusion.

A Koval fractional flow model is introduced to track and calculate water-cut during the development of the fracture-cavity reservoir, which describes a water-cut rising characteristic of the fracture-cavity reservoir accurately. The expression $f_w$ of a Koval fractional flow model is:

$$f_w = \frac{1}{1 + \frac{1 - \overline{S_w}}{K_{val}\frac{\mu_o}{\mu_w}\overline{S_w}}}$$

(5)

where:

$$\overline{S_w} = \frac{S_w - S_{wc}}{1 - S_{wc}}.$$

(6)

For each time step, the calculation of formula (3) to formula (5) is repeated, and at each time step, dynamic data of pressure, fluid saturation and water cut of all fractures and cavities in the first fault-controlled fracture-cavity reservoir discrete spatial topological network model is obtained.

By analyzing the dynamic data of pressure, fluid saturation and water cut of the fractures and cavities obtained above, the conductivity corresponding to the fault-controlled fractures and cavities can be obtained, where sensitive parameters may include a Koval coefficient, a liquid production index, absolute permeability, conductivity, a non-Darcy flow coefficient and water influx speed (water influx amount). The Koval coefficient refers to the seepage ability of fluid in the fractures and cavities, which is used to describe the fluid fluidity in the fractures and cavities and mainly affects the water-cut rising law. The liquid production index refers to the liquid production amount produced in unit area of the fractures and cavities under unit pressure difference. The absolute permeability refers to the permeation ability of fluid in the rock or reservoir layer passing through unit area. The greater the absolute permeability, the greater the permeability of the rock or reservoir to fluid, and the larger the corresponding cumulative oil production. The conductivity refers to the velocity and ability of the fluid in the fractures and cavities to conduct in the rock or reservoir layer. The greater the conductivity, the faster the conduction velocity of the fluid in the fractures and cavities, and the larger the corresponding cumulative oil production. The non-Darcy flow coefficient refers to an influence factor considering the non-Darcy effect in the fluid flow. The larger the non-Darcy flow coefficient, the smaller the influence of the non-Darcy effect on the fluid flow, and the larger the corresponding cumulative oil production. The water influx speed indicates the speed and amount of water entering the reservoir. The greater the water influx speed, the more the water influx amount, and the smaller the corresponding cumulative oil production.

S302, obtaining a cumulative oil production corresponding to the fault-controlled fractures and cavities, establishing a correspondence between the cumulative oil production and the sensitive parameters according to the sensitive parameters, and analyzing a sensitivity of the cumulative oil production according to the correspondence to obtain sensitive parameter values corresponding to the fault-controlled fractures and cavities.

Figure 5:
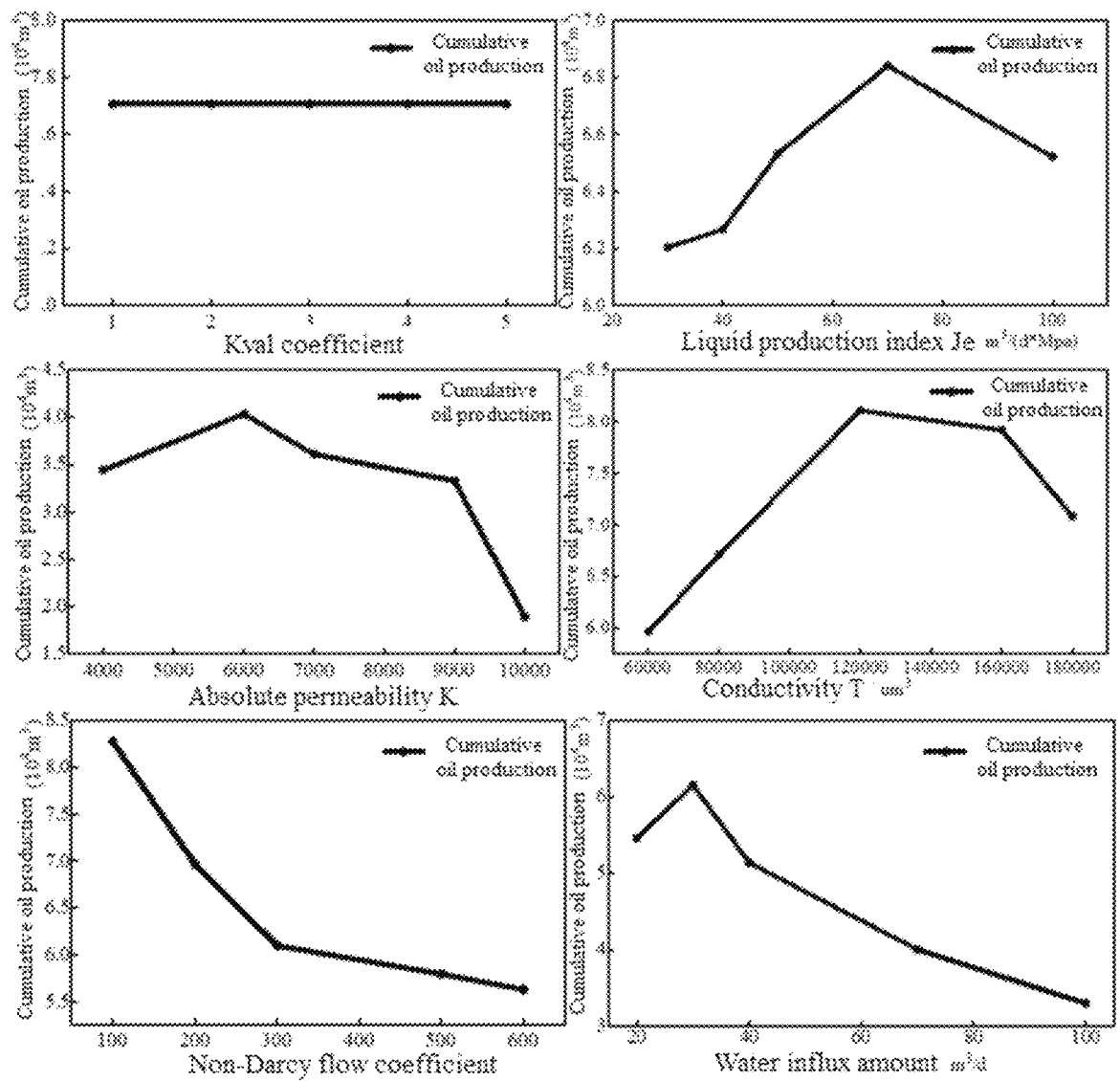
FIG. 5 is a schematic diagram of a correspondence between a cumulative oil production corresponding to fault-controlled fractures and cavities and sensitive parameters provided by an embodiment of the present application.

In this embodiment, FIG. 5 is a schematic diagram of a correspondence between a cumulative oil production and sensitive parameters corresponding to fault-controlled fractures and cavities provided by an embodiment of the present application. As shown in FIG. 5, according to correspondences between the cumulative oil production corresponding to the fault-controlled fractures and cavities and the sensitive parameters (the Koval coefficient, the liquid production index, the absolute permeability, the conductivity, the non-Darcy flow coefficient and the water influx speed (water influx amount)), the following conclusions are obtained: the Koval coefficient mainly affects the water-cut rising law, but has little influence on the cumulative oil production effect of the fault-controlled fractures and cavities; the liquid production index, the absolute permeability, the conductivity, the non-Darcy flow coefficient and the water influx speed all have significant effects on the cumulative oil production effect of the fault-controlled fractures and cavities. The sensitive parameter values at inflection points or lager-slope points in FIG. 5, which affect the change law of the cumulative oil production, are selected as the sensitive parameter values that are used as priori estimation of production history fitting parameters of a single well in the fault-controlled fractures and cavities, as shown in Table 1.

actual observation data is established, and the expression of the least square objective function is:

$$\Theta = \frac{\sum_i \sum_t ((f_w - f_w^s)^2)_{i,t}}{N * \text{mean}(f_w)} \quad (7)$$

where $f_w$ is a water-cut prediction result and $f_w^s$ is actual water-cut observation data.

The above least square objective function is a mathematical optimization method, and the least square objective function is used to find target parameter values by minimizing a difference between the predicted sensitive parameter values and the actual observation data, the target parameter values being the obtained performance representation parameters.

S304, performing, according to the sensitive parameter values, inversion processing on the performance representation parameters by using a particle swarm algorithm to obtain an inversion result.

In this embodiment, the sensitive parameter values are taken as parameters of production history fitting, and parameter inversion or optimization is performed on the performance representation parameters by using the particle swarm algorithm, so as to find a global target solution of control parameter vectors that minimizes an error between the simulated production history data and the actual observation data.

In the production history fitting problem, each particle can represent a control parameter vector. Through search and iteration processes and by using the production history data as the objective function, the particle swarm algorithm will adjust positions and speeds of particles gradually to minimize an error between the sensitive parameter values and the performance representation parameters, so as to obtain the global objective solution, that is, the inversion result.

TABLE 1

Sensitive parameter values corresponding to fault-controlled fractures and cavities

| Sensitive parameter | Koval coefficient (dimensionless) | Liquid production index Je (m³/(d*MPa)) | Absolute permeability (md) | Conductivity (μm³) | Non-Darcy flow coefficient (1/m) | Water influx speed (m³/d) |
|---|---|---|---|---|---|---|
| Priori estimation | 3 | 55 | 6000 | 115000 | 150 | 30 |

S303, processing the sensitive parameters by using a least square objective function to obtain performance representation parameters.

In this embodiment, the water-cut of different single wells in the fault-controlled fractures and cavities are predicted according to formula (5) by using the quantitative representation model of the production performance of the fault-controlled fracture-cavity reservoir. A least square objective function that represents the average sum of squared correction errors between water-cut prediction results of all single wells in the fault-controlled fractures and cavities and the S305. Analyzing the sensitive parameters according to the inversion result to obtain the development performance characteristic of the fault-controlled fracture-cavity reservoir.

In this embodiment, according to the inversion result, differences of sensitive parameters of different single wells in the fault-controlled fractures and cavities are analyzed. A first single well and a second single well in the fault-controlled fractures and cavities are taken as an example here, as shown in Table 2.

TABLE 2

Inversion result of production performance representation parameters of first
single well and second single well in fault-controlled fractures and cavities

| Well name | Koval coefficient (dimensionless) | Liquid production index Je (m³/(d*MPa)) | Absolute permeability (md) | Conductivity (μm³) | Non-Darcy flow coefficient (1/m) | Water influx speed (m³/d) |
| --- | --- | --- | --- | --- | --- | --- |
| First single well | 3.34 | 99.8 | 104.9 | 118345 | 0.0592 | 28.4 |
| Second single well | 2.76 | 56.0 | | | | |

By analyzing the sensitive parameters, the development performance characteristic of the fault-controlled fracture-cavity reservoir is obtained: the first single well has a high liquid production index and strong liquid production ability; the water-cut Koval coefficients of the first single well and the second single well are high, and a risk of flooding in a later period is high; the equivalent conductivity of the network model is large, and the non-Darcy flow coefficient is small, which indicates that there is a channel of high conductivity on the fracture surface at the bottom of the fracture-cavity unit, and the fluid vertical equilibrium effect is remarkable; the injected water can quickly spread to the bottom of the reservoir, and the oil-water interface rises uniformly, which is conducive to the diffusion and mixing of water in the reservoir, thus improving the cumulative oil production effect.

The present application provides the method for data-driven fracture-cavity reservoir development and evaluation. In the method, the sensitive parameters corresponding to the fault-controlled fractures and cavities are obtained by analyzing and processing the quantitative representation model of the production performance of the fault-controlled fracture-cavity reservoir, thus providing quantitative information of reservoir dynamic changes, and the sensitive parameter values corresponding to the fault-controlled fracture-cavity reservoir, namely parameters that have great influence on reservoir development and production performance, are determined through the sensitive parameters, providing a basis for subsequent optimization, regulation and control of the sensitive parameters. The performance representation parameters can be obtained by using the least square objective function to process the sensitive parameters, and by optimizing and fitting the parameters, the accuracy and precision of the model are improved. According to the sensitive parameter values, inversion processing is performed on the performance representation parameters by using the particle swarm algorithm, that is, the optimal solution is deduced in reverse by the optimization algorithm, and more accurate performance representation parameter values are obtained. According to the inversion result, the sensitive parameters are analyzed to obtain the development performance characteristic of the fault-controlled fracture-cavity reservoir, which provides scientific basis for reservoir development decision-making and optimization.

Figure 6:
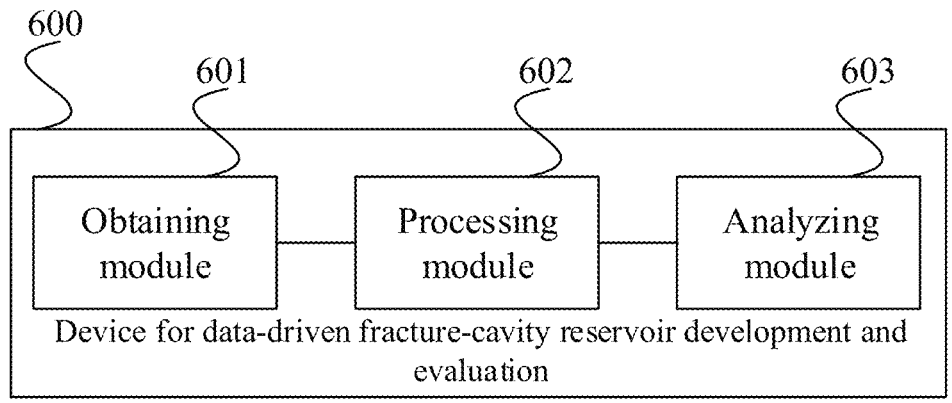
FIG. 6 is a schematic structural diagram of a device for data-driven fracture-cavity reservoir development and evaluation provided by an embodiment of the present application.

FIG. 6 is a schematic structural diagram of a device for data-driven fracture-cavity reservoir development and evaluation provided by an embodiment of the present application. The device of this embodiment may be in a form of software and/or hardware. As shown in FIG. 6, a device 600 for data-driven fracture-cavity reservoir development and evaluation provided by this embodiment of the present application includes: an obtaining module 601, a processing module 602 and an analyzing module 603, the obtaining module 601 is configured to obtain a fracture-cavity spatial topological relationship, a geometric shape and a fracture-cavity physical model of fault-controlled fractures and cavities, and establish a fault-controlled fracture-cavity reservoir discrete spatial topological network model corresponding to the fault-controlled fractures and cavities according to the fracture-cavity spatial topological relationship and the geometric shape;

the processing module 602 is configured to perform, according to the first fault-controlled fracture-cavity reservoir discrete spatial topological network model, modeling processing on quantitative representation of production performance of a fault-controlled fracture-cavity reservoir by using a fluid vertical equilibrium mechanism and a non-Darcy flow law, to form a quantitative representation model of the production performance of the fault-controlled fracture-cavity reservoir;

the analyzing module 603 is configured to perform analyzing processing on the quantitative representation model of the production performance of the fault-controlled fracture-cavity reservoir to obtain a development performance characteristic of the fault-controlled fracture-cavity reservoir, and develop the fault-controlled fracture-cavity reservoir according to the development performance characteristic.

In a possible implementation, the obtaining module 601 is further configured to:

perform segmentation processing on the fault-controlled fractures and cavities according to the fracture-cavity spatial topological relationship and the geometric shape to obtain a plurality of segmented bodies; where the segmented bodies include fracture-segmented bodies and cavity-segmented bodies;

perform analyzing processing on the plurality of segmented bodies to obtain geometric parameters of respective segmented bodies and a distance threshold value between the segmented bodies;

establish the first fault-controlled fracture-cavity reservoir discrete spatial topological network model corresponding to the fault-controlled fractures and cavities according to the geometric parameters and the distance threshold value.

In a possible implementation, the processing module 602 is further configured to:

establish a continuity equation and a motion equation of fluid in the fault-controlled fractures and cavities by using the fluid vertical equilibrium mechanism and the non-Darcy flow law;

perform coupling processing on the continuity equation and the motion equation to obtain a coupling result, and perform the modeling processing on the quantitative representation of the production performance of the fault-controlled fracture-cavity reservoir according to the coupling result.

In a possible implementation, the analyzing module 603 is further configured to:

perform fluid vertical equilibrium testing processing on the fracture-cavity physical model to obtain a first dynamic evolution law of oil-water distribution;

perform fluid vertical equilibrium testing processing on the quantitative representation model of the production performance of the fault-controlled fracture-cavity reservoir to obtain a second dynamic evolution law of oil-water distribution;

determine an accuracy parameter of the quantitative representation model of the production performance of the fault-controlled fracture-cavity reservoir according to the first dynamic evolution law and the second dynamic evolution law;

when the accuracy parameter indicates that the quantitative representation model of the production performance of the fault-controlled fracture-cavity reservoir is accurate, perform the analyzing processing on the quantitative representation model of the production performance of the fault-controlled fracture-cavity reservoir to obtain the development performance characteristic of the fault-controlled fracture-cavity reservoir.

In a possible implementation, the analyzing module 603 is further configured to:

perform the analyzing processing on the quantitative representation model of the production performance of the fault-controlled fracture-cavity reservoir to obtain sensitive parameters corresponding to the fault-controlled fractures and cavities;

perform inversion processing on the sensitive parameters to obtain an inversion result;

analyze the sensitive parameters according to the inversion result to obtain the development performance characteristic of the fault-controlled fracture-cavity reservoir.

In a possible implementation, the analyzing module 603 is further configured to:

obtain a cumulative oil production corresponding to the fault-controlled fractures and cavities, establishing a correspondence between the cumulative oil production and the sensitive parameters according to the sensitive parameters, and analyze a sensitivity of the cumulative oil production according to the correspondence to obtain sensitive parameter values corresponding to the fault-controlled fractures and cavities;

perform the inversion processing on the sensitive parameters corresponding to the fault-controlled fractures and cavities according to the sensitive parameter values to obtain the inversion result.

In a possible implementation, the analyzing module 603 is further configured to:

process the sensitive parameters by using a least square objective function to obtain performance representation parameters;

perform, according to the sensitive parameter values, inversion processing on the performance representation parameters by using a particle swarm algorithm to obtain the inversion result.

Figure 7:
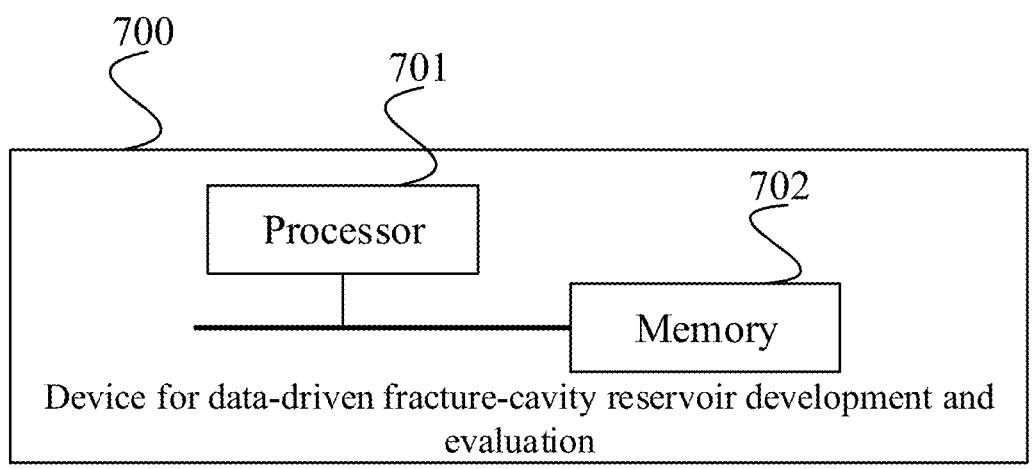
FIG. 7 is a schematic diagram of a hardware structure of a device for data-driven fracture-cavity reservoir development and evaluation provided by an embodiment of the present application.

FIG. 7 is a schematic diagram of a hardware structure of a device for data-driven fracture-cavity reservoir development and evaluation provided by an embodiment of the present application. As shown in FIG. 7, a device 700 for data-driven fracture-cavity reservoir development and evaluation includes:

a processor 701 and a memory 702;

the memory stores computer execution instructions;

the processor executes the computer execution instructions stored in the memory 702 to cause the device for data-driven fracture-cavity reservoir development and evaluation to execute the method for data-driven fracture-cavity reservoir development and evaluation as described above.

It should be understood that the processor 701 above may be a central processing unit (CPU for short), and may also be other general processor, digital signal processor (DSP for short), application specific integrated circuit (ASIC for short), etc. The general processor may be a microprocessor or the processor may be any regular processor, etc. The steps of the method disclosed in the present application may be directly embodied as being completed by execution of a hardware processor, or being completed by combined execution of hardware and software modules in a processor. The memory 702 may include a high-speed random access memory (RAM for short), and may further include a non-volatile memory (NVM for short), such as at least one disk memory, or a U disk, a removable hard disk, a read-only memory, a magnetic disk or an optical disk, etc.

Correspondingly, an embodiment of the present application provides a computer-readable storage medium, in which computer execution instructions are stored, and when the computer execution instructions are executed by a processor, the method for data-driven fracture-cavity reservoir development and evaluation is implemented.

The terms "first", "second" and the like in the description and claims of the present application and the above drawings are used to distinguish similar objects, and are not necessarily used to describe a specific order or sequence. It should be understood that the terms such used can be interchanged under appropriate circumstances, so that the embodiments of the present application described herein can be implemented in orders other than those illustrated or described in drawings or description, for example. Furthermore, the terms "include" and "have" and any variations thereof are intended to cover non-exclusive inclusion. For example, processes, systems, products or devices that include a series of steps or units are not limited to those steps or units explicitly listed, but may include other steps or units not explicitly listed or inherent to these processed, products or devices.

It should be noted that in the embodiments of the present application, the words "exemplary" or "for example" are used to represent examples, illustrations or explanations. Any embodiment or design described as "exemplary" or "for example" in the present application should not be interpreted as being preferred or advantageous over other embodiments or designs. To be exact, the use of words such as "exemplary" or "for example" aims to present related concepts in a specific way.

It should be noted that for the sake of simple description, all the aforementioned method embodiments are expressed as a series of action combinations, but those skilled in the art should know that the present application is not limited by the described action sequence, because some steps can be performed in other sequences or at the same time according to the present application. Secondly, those skilled in the art should also know that the embodiments described in the description are all belong to optional embodiments, and the actions and modules involved are not necessarily necessary for the present application.

It should be further noted that although the steps in the flowchart are displayed in sequence as indicated by arrows, these steps are not necessarily executed in sequence as indicated by the arrows. Unless explicitly stated herein, the execution of these steps is not strictly limited in order, and these steps can be executed in other orders. Moreover, at least a part of the steps in the flowchart may include a plurality of sub-steps or stages, which may not necessarily be completed at the same time, but may be executed at different times. The execution order of these sub-steps or stages may not necessarily be sequential, but may be executed with other steps or at least a part of sub-steps or stages of other steps in turn or alternately.

It should be understood that the above device embodiments are only schematic, and the device of the present application can also be realized in other ways. For example, the division of units/modules in the above embodiments is only a logical function division, and there may be other division manners in actual implementation. For example, multiple units, modules or components may be combined or may be integrated into another system, or some features may be omitted or not performed.

In addition, unless otherwise specified, the functional units/modules in the embodiments of the present application may be integrated into one unit/module, or each unit/module may exist physically alone, or two or more units/modules may be integrated together. The above integrated units/modules can be realized in the form of hardware or software program modules.

An integrated unit/module may be stored in a computer-readable memory if it is implemented in the form of a software program module and sold or used as an independent product. Based on this understanding, the technical solution of the present application in essence, or the part thereof that contributes to the prior art, or all or part of the technical solution can be embodied in the form of a software product. The computer software product is stored in a memory and includes several instructions for causing a computer device (which may be a personal computer, a server or a network device, etc.) to execute all or part of the steps of the methods of various embodiments of the present application. The aforementioned memory includes: a U disk, a read-only memory (ROM, Read-Only Memory), a random access memory (RAM, Random Access Memory), a removable hard disk, a magnetic disk, an optical disk or other media that can store program codes.

In the above embodiments, the description of each embodiment has its own emphasis. For the parts not detailed in one embodiment, please refer to the relevant descriptions of other embodiments. The technical features of the above embodiments can be combined at will. For the sake of brevity, not all of the possible combinations of the technical features in the above embodiments are described. However, as long as there is no contradiction in the combinations of these technical features, they should be considered as the scope recorded in this specification.

Other embodiments of the present application will easily occur to those skilled in the art after considering the specification and practicing the present application disclosed herein. The present application is intended to cover any variations, uses or adaptations of the present application, which follow the general principles of the present application and include common knowledge or conventional technical means in this technical field that are not disclosed in the present application. The description and examples are to be regarded as exemplary only, with the true scope and spirit of the present application being indicated by the following claims.

It should be understood that the present application is not limited to the precise structure described above and shown in the drawings, and various modifications and changes can be made without departing from its scope. The scope of the present application is limited only by the appended claims.

What is claimed is:

1. A method for data-driven fracture-cavity reservoir development and evaluation, comprising:
obtaining a fracture-cavity spatial topological relationship, a geometric shape and a fracture-cavity physical model of fault-controlled fractures and cavities, and performing segmentation processing on the fault-controlled fractures and cavities according to the fracture-cavity spatial topological relationship and the geometric shape to obtain a plurality of segmented bodies; wherein the segmented bodies comprise fracture-segmented bodies and cavity-segmented bodies; performing analyzing processing on the plurality of segmented bodies to obtain geometric parameters of respective segmented bodies and a distance threshold value between the segmented bodies; establishing a first fault-controlled fracture-cavity reservoir discrete spatial topological network model corresponding to the fault-controlled fractures and cavities according to the geometric parameters and the distance threshold value establishing, according to the first fault-controlled fracture-cavity reservoir discrete spatial topological network model, a continuity equation and a motion equation of fluid in the fault-controlled fractures and cavities by using a fluid vertical equilibrium mechanism and a non-Darcy flow law;
performing coupling processing on the continuity equation and the motion equation to obtain a coupling result, and performing the modeling processing on the quantitative representation of the production performance of the fault-controlled fracture-cavity reservoir according to the coupling result, to form a quantitative representation model of the production performance of the fault-controlled fracture-cavity reservoir;
performing analyzing processing on the quantitative representation model of the production performance of the fault-controlled fracture-cavity reservoir to obtain a development performance characteristic of the fault-controlled fracture-cavity reservoir, and developing the fault-controlled fracture-cavity reservoir according to the development performance characteristic;
wherein the performing the analyzing processing on the quantitative representation model of the production performance of the fault-controlled fracture-cavity reservoir to obtain the development performance characteristic of the fault-controlled fracture-cavity reservoir comprises:
performing the analyzing processing on the quantitative representation model of the production performance of the fault-controlled fracture-cavity reservoir to obtain sensitive parameters corresponding to the fault-controlled fractures and cavities;
obtaining a cumulative oil production corresponding to the fault-controlled fractures and cavities, establishing a correspondence between the cumulative oil production and the sensitive parameters according to the sensitive parameters, and analyzing a sensitivity of the cumulative oil production according to the correspondence to obtain sensitive parameter values corresponding to the fault-controlled fractures and cavities;
processing the sensitive parameters by using a least square objective function to obtain performance representation parameters;

performing, according to the sensitive parameter values, inversion processing on the performance representation parameters by using a particle swarm algorithm to obtain the inversion result;

analyzing the sensitive parameters according to the inversion result to obtain the development performance characteristic of the fault-controlled fracture-cavity reservoir.

2. The method according to claim 1, wherein before performing the analyzing processing on the quantitative representation model of the production performance of the fault-controlled fracture-cavity reservoir to obtain the development performance characteristic of the fault-controlled fracture-cavity reservoir, the method comprises:

performing fluid vertical equilibrium testing processing on the fracture-cavity physical model to obtain a first dynamic evolution law of oil-water distribution;

establishing a second fault-controlled fracture-cavity reservoir discrete spatial topological network model according to the fracture-cavity physical model, and performing fluid vertical equilibrium testing processing on the second fault-controlled fracture-cavity reservoir discrete spatial topological network model according to the quantitative representation model of the production performance of the fault-controlled fracture-cavity reservoir to obtain a second dynamic evolution law of oil-water distribution;

determining an accuracy parameter of the quantitative representation model of the production performance of the fault-controlled fracture-cavity reservoir according to the first dynamic evolution law and the second dynamic evolution law;

when the accuracy parameter indicates that the quantitative representation model of the production performance of the fault-controlled fracture-cavity reservoir is accurate, performing the analyzing processing on the quantitative representation model of the production performance of the fault-controlled fracture-cavity reservoir to obtain the development performance characteristic of the fault-controlled fracture-cavity reservoir.

3. A device for data-driven fracture-cavity reservoir development and evaluation, comprising: a processor and a memory;

the memory stores computer execution instructions;

the processor executes the computer execution instructions stored in the memory, so that the processor is configured to:

obtain a fracture-cavity spatial topological relationship, a geometric shape and a fracture-cavity physical model of fault-controlled fractures and cavities, and perform segmentation processing on the fault-controlled fractures and cavities according to the fracture-cavity spatial topological relationship and the geometric shape to obtain a plurality of segmented bodies; wherein the segmented bodies comprise fracture-segmented bodies and cavity-segmented bodies; perform analyzing processing on the plurality of segmented bodies to obtain geometric parameters of respective segmented bodies and a distance threshold value between the segmented bodies; establish a first fault-controlled fracture-cavity reservoir discrete spatial topological network model corresponding to the fault-controlled fractures and cavities according to the geometric parameters and the distance threshold value;

establish, according to the first fault-controlled fracture-cavity reservoir discrete spatial topological network model, a continuity equation and a motion equation of fluid in the fault-controlled fractures and cavities by using a fluid vertical equilibrium mechanism and a non-Darcy flow law; perform coupling processing on the continuity equation and the motion equation to obtain a coupling result, and perform the modeling processing on the quantitative representation of the production performance of the fault-controlled fracture-cavity reservoir according to the coupling result to form a quantitative representation model of the production performance the fault-controlled fracture-cavity reservoir;

perform analyzing processing on the quantitative representation model of the production performance of the fault-controlled fracture-cavity reservoir to obtain a development performance characteristic of the fault-controlled fracture-cavity reservoir, and develop the fault-controlled fracture-cavity reservoir according to the development performance characteristic;

wherein the processor is specifically configured to:

perform the analyzing processing on the quantitative representation model of the production performance of the fault-controlled fracture-cavity reservoir to obtain sensitive parameters corresponding to the fault-controlled fractures and cavities;

obtain a cumulative oil production corresponding to the fault-controlled fractures and cavities, establish a correspondence between the cumulative oil production and the sensitive parameters according to the sensitive parameters, and analyze a sensitivity of the cumulative oil production according to the correspondence to obtain sensitive parameter values corresponding to the fault-controlled fractures and cavities;

process the sensitive parameters by using a least square objective function to obtain performance representation parameters;

perform, according to the sensitive parameter values, inversion processing on the performance representation parameters by using a particle swarm algorithm to obtain the inversion result;

analyze the sensitive parameters according to the inversion result to obtain the development performance characteristic of the fault-controlled fracture-cavity reservoir.

4. The device according to claim 3, wherein the processor is specifically configured to:

perform fluid vertical equilibrium testing processing on the fracture-cavity physical model to obtain a first dynamic evolution law of oil-water distribution;

establish a second fault-controlled fracture-cavity reservoir discrete spatial topological network model according to the fracture-cavity physical model, and performing fluid vertical equilibrium testing processing on the second fault-controlled fracture-cavity reservoir discrete spatial topological network model according to the quantitative representation model of the production performance of the fault-controlled fracture-cavity reservoir to obtain a second dynamic evolution law of oil-water distribution;

determine an accuracy parameter of the quantitative representation model of the production performance of the fault-controlled fracture-cavity reservoir according to the first dynamic evolution law and the second dynamic evolution law;

when the accuracy parameter indicates that the quantitative representation model of the production performance of the fault-controlled fracture-cavity reservoir is accurate, perform the analyzing processing on the quantitative representation model of the production performance of the fault-controlled fracture-cavity reservoir to obtain the development performance characteristic of the fault-controlled fracture-cavity reservoir.

5. A non-transitory computer-readable storage medium, wherein the non-transitory computer-readable storage medium has computer-executable instructions stored thereon, and when a processor executes the computer-executable instructions, the method for data-driven fracture-cavity reservoir development and evaluation according to claim 1 is implemented.

6. The non-transitory computer-readable storage medium according to claim 5, wherein before performing the analyzing processing on the quantitative representation model of the production performance of the fault-controlled fracture-cavity reservoir to obtain the development performance characteristic of the fault-controlled fracture-cavity reservoir, the method comprises:

performing fluid vertical equilibrium testing processing on the fracture-cavity physical model to obtain a first dynamic evolution law of oil-water distribution;

establishing a second fault-controlled fracture-cavity reservoir discrete spatial topological network model according to the fracture-cavity physical model, and performing fluid vertical equilibrium testing processing on the second fault-controlled fracture-cavity reservoir discrete spatial topological network model according to the quantitative representation model of the production performance of the fault-controlled fracture-cavity reservoir to obtain a second dynamic evolution law of oil-water distribution;

determining an accuracy parameter of the quantitative representation model of the production performance of the fault-controlled fracture-cavity reservoir according to the first dynamic evolution law and the second dynamic evolution law;

when the accuracy parameter indicates that the quantitative representation model of the production performance of the fault-controlled fracture-cavity reservoir is accurate, performing the analyzing processing on the quantitative representation model of the production performance of the fault-controlled fracture-cavity reservoir to obtain the development performance characteristic of the fault-controlled fracture-cavity reservoir.

* * * * *